UNITED STATES PATENT OFFICE.

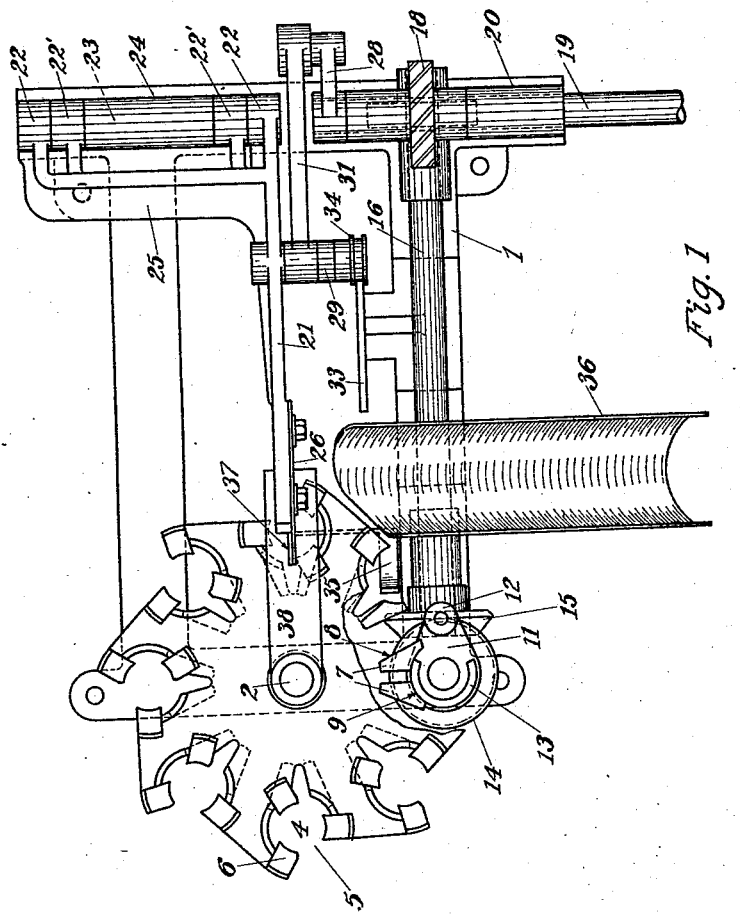

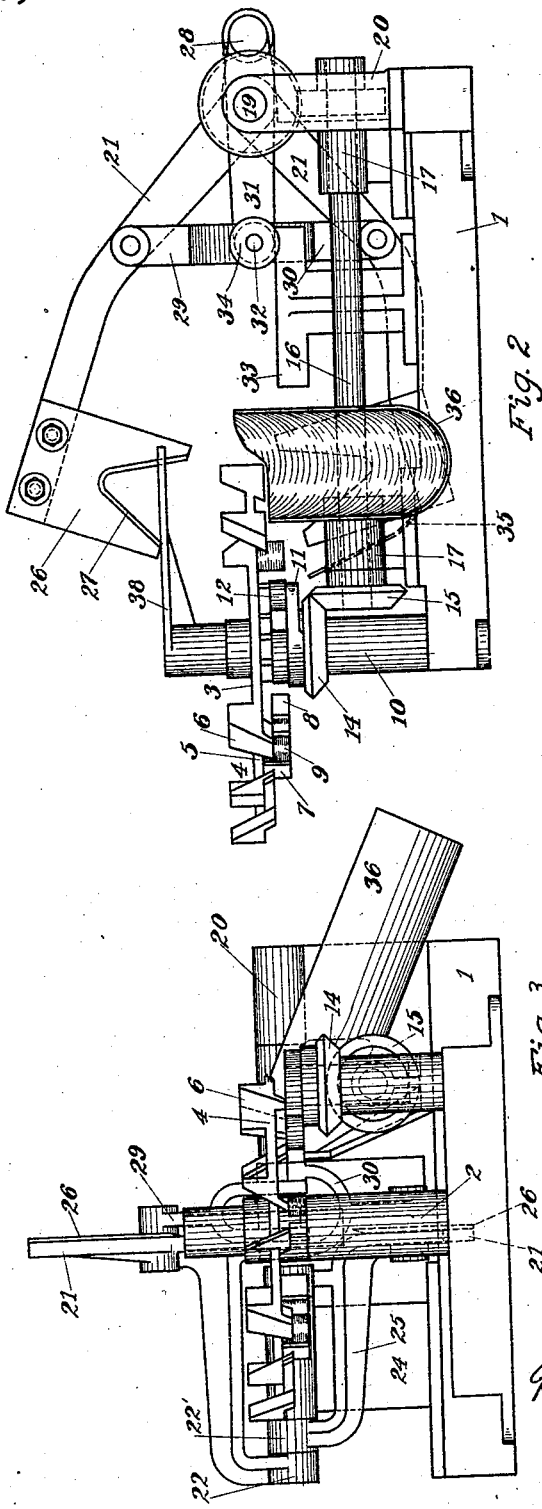

JAMES A. GRAY, OF SAN FRANCISCO, CALIFORNIA.

FRUIT-CUTTING APPARATUS.

1,417,666.

Specification of Letters Patent.   Patented May 30, 1922.

Application filed September 12, 1921. Serial No. 500,083.

*To all whom it may concern:*

Be it known that I, JAMES A. GRAY, a citizen of the United States, residing at the city and county of San Francisco, and State of California, have invented certain new and useful Improvements in Fruit-Cutting Apparatus, of which the following is a specification.

This invention relates to that type of apparatus designed for annularly cutting fruit containing a hard central stone inwardly from its surface to the stone to provide half portions adapted for subsequent separation from the stone.

It is one of the principal objects of this invention to provide an apparatus wherein the fruit is supported while being cut and is on a subsequent cutting operation automatically discharged from its support.

A further object is to provide a simple form of mechanism for operating the cutting arms, and to provide a simple form of mechanism for imparting an intermittent movement to the cutting arms and fruit supporting turret.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in top plan of the preferred embodiment of my invention, with a portion of the turret broken away disclosing the Geneva gear movement for imparting an intermittent rotative movement to the turret.

Figure 2 is a view in side elevation, and

Figure 3 is a view in end elevation.

Referring more particularly to the several views of the drawings wherein like characters of reference designate corresponding parts, 1 is a base provided at one end approximately in its longitudinal center with a tubular turret supporting post 2 extending vertically therefrom, and said post rotatably mounts on its upper end a substantially circular turret 3 formed at its peripheral edge with fruit receiving pockets 4, each of which opens as at 5 at the periphery of the turret. The peripheral wall of the respective pockets 4 is provided with a plurality of downwardly and inwardly inclined fruit supporting fingers 6, on which rest the peaches or other fruit to be cut, and which are preferably deposited by an operator within successive pockets on the rotation of the turret. As particularly illustrated in Figure 1, the underside of the turret adjacent each pocket is formed with a pair of integral lugs 7, the outer side walls of which incline inwardly as at 8, toward the axis of rotation of the turret. The outer face or surface of each pair of lugs is curved, as at 9, forming a turret locking quadrant. Disposed vertically from the base 1 adjacent the member 2 is a post 10 rotatably mounting at its upper end the crank 11 which carries on its end an antifriction roller 12, and said arm, at a point surrounding its axis of rotation carries a segmental locking cam 13. On the rotation of the crank 11, the roller 12 co-operates with the surfaces 8 of lugs 7, and the locking cam 13 co-operates with the surface 9 of the lug 7, this construction forming the conventional Geneva movement for intermittently rotating the turret locking the same in its successive steps of rotation. Associated with the crank 11 is a gear 14 intermeshing with a corresponding gear 15 on the end of a rotatably mounted shaft 16 supported in bearings 17. This shaft 16 is driven through a spiral gear connection 18 from a crank or power shaft 19 extending transversely of the rear end of the base 1 and rotatably mounted in bearings 20.

For cutting the fruit, as the same is successively presented by the rotation of the turret, I provide a pair of arms 21 disposed in parallel relation longitudinally of the center of the base 1 and pivotally mount said arms as at 22 and 22' at a plurality of points on a supporting shaft 23 carried by a member 24 and disposed in parallel relation with a crank or power shaft 19. The fulcruming of the arms 21 at a plurality of points is made possible by extending the lateral support 25 at right angles from each arm, and forming at their respective ends portions 22 and 22' for providing the double fulcrum. The arms 21 are of a length to terminate adjacent to a pocket in the turret containing the fruit to be cut, and said arms each carry a cutting blade or knife 26, each formed with a substantially V-shaped cutting edge 27, the cutting edges of said blades being disposed in co-operative relation, and the same are adapted for movement in opposite directions into the pockets 4 through their peripheral openings 5. By providing the V cutting edges, the knives simultaneously cut the fruit from opposite sides from its surface inwardly to the hard substance or stone, thus forming an annular score completely penetrating the pulp, and permitting the subsequent halving of the fruit in any suitable manner.

To simultaneously operate the arms carrying the knives 26, I connect the said arms at a point in advance of their point of fulcrum with a crank 28 on the end of the shaft 19 by a toggle joint consisting of the links 29, 30 and 31, connected as at 32, forming the well known toggle link construction.

At the point of application of power to the links 29 and 30, I support the same on a track 33 on which runs a roller 34 carried by the point of pivotal connection 32.

To automatically remove the cut fruit from one pocket during a succeeding cutting operation of the fruit contained in the succeeding pocket, I secure to the lower arm 21 adjacent its end, an expeller finger or member 35, the end of which is disposed so as to project upwardly into the pocket 4 containing the cut fruit during the upward movement of the arm 21 when the fruit in an immediately succeeding pocket is being cut. This expeller arm raises the cut fruit from the pocket and discharges the same through the peripheral opening 5 into the conveyer or trough 36, as illustrated in the drawings.

To prevent the lifting of the fruit from the pocket by adhering to the upper blade or knife 26, said knife operates through an opening 37 in a stripper plate 38 overhanging the turret 3, and carried at the upper end of the post 2.

By my improved apparatus, a continuous even cut is made in the fruit as the same is successively presented by the rotation of the turret, and said cut extends inwardly from the surface of the fruit to the stone or pit, it enabling the subsequent halving of the fruit with little effort, and at the same time precluding the spoiling of the fruit for preserving by unevenly cutting the same, or annularly cutting the same in a manner in which the ends of the cut do not intersect.

It will be apparent that the present machine is capable of operation at a relatively high speed, thus ensuring an increased output over that accomplished by manual hand cutting and ensuring a uniform cut in the fruit at all times.

While the present apparatus as illustrated discloses cutting knives having a single length stroke, it is obvious that means may be employed in connection therewith to enable the stroke thereof to be varied whereby fruit having pits of various diameters may be accommodated.

Having thus described my invention, what I claim as new and desire to secure by Letters Patent of the United States is as follows:—

1. A machine, for annularly cutting fruit containing a hard central stone, for the subsequent halving of the fruit from the stone, comprising a rotatable turret support for the fruit provided with a plurality of fruit receiving pockets, means for cutting the fruit to form a continuous score annularly thereof inwardly from its surface to the stone, means for intermittently rotating said turret for presenting the fruit contained in succeeding pockets to said cutting means, and means carried by and offset from said cutting means for automatically lifting the cut fruit from its associated pocket during the cutting of the fruit in a succeeding pocket.

2. A machine, for annularly cutting fruit containing a hard central stone, for the subsequent halving thereof, the same comprising a rotatable turret provided with a plurality of fruit receiving pockets, a pair of pivotally mounted knife supporting arms, a knife carried by each arm, and having a substantially V-shaped cutting edge, a toggle connecting said arms, a crank connected with and for operating said toggle to move said knives for cutting the fruit to form a continuous score annularly thereof inwardly from its surface to the stone, and means for rotating said turret and operating said arms in timed relation.

3. A machine, for annularly cutting fruit containing a hard central stone, for the subsequent halving thereof, the same comprising a rotatable turret provided with a plurality of fruit receiving pockets, a pair of pivotally mounted knife supporting arms, a knife carried by each arm and having a substantially V-shaped cutting edge, a toggle connecting said arms, a crank connected with and for operating said toggle to move said knives for cutting the fruit to form a continuous score annularly thereof inwardly from its surface to the stone, a shaft mounting said crank, a turret drive shaft intergeared with said crank shaft, and means driven by said shaft for co-operating with said turret for imparting a stepped rotation thereto.

4. A machine, for annularly cutting fruit containing a hard central stone, for the subsequent halving thereof, the same comprising a rotatable turret provided with a plurality of fruit receiving pockets, a pair of pivotally mounted knife supporting arms, a knife carried by each arm, and having a substantially V-shaped cutting edge, means for operating said knives to cut the fruit annularly thereof inwardly from its surface to the stone, a part carried by one of said arms for projecting upwardly into one of said pockets to remove the cut fruit therefrom on the cutting of the fruit in a succeeding pocket, a conveyor for receiving the cut fruit as discharged from the pockets, and means for imparting an intermittent movement to said turret and arms.

5. A machine, for annularly cutting fruit containing a hard central stone, for the subsequent halving thereof, the same comprising a rotatable turret provided with a plurality of fruit receiving pockets, a pair of pivotally mounted knife supporting arms, a knife carried by each arm, and having a substantially V-shaped cutting edge, means for operating said knives to cut the fruit annularly thereof inwardly from its surface to the stone, a part carried by one of said arms for projecting upwardly into one of said pockets to remove the cut fruit therefrom during the cutting of the fruit in a succeeding pocket, a conveyer for receiving the cut fruit as removed from said pockets, a stripper through which the knife of said other arm operates and disposed above said turret for precluding the lifting of the fruit from its pocket during the cutting thereof, and means for intermittently operating said turret and arms.

In testimony whereof I have signed my name to this specification.

JAMES A. GRAY.